United States Patent [19]

Pucciarello

[11] 4,404,522
[45] Sep. 13, 1983

[54] DISPLAY CONNECTION SCHEME FOR MODULAR ANALOG/DIGITAL INSTRUMENT

[75] Inventor: Frank Pucciarello, Newark, N.J.

[73] Assignee: Sangamo Weston, Inc., Norcross, Ga.

[21] Appl. No.: 262,848

[22] Filed: May 12, 1981

[51] Int. Cl.³ .......................... G01R 1/00; G01R 1/04
[52] U.S. Cl. .................................. 324/114; 116/300; 324/156
[58] Field of Search ...................... 324/114, 156, 157; 340/700, 815.2; 116/286, 300; 73/431

[56] References Cited

U.S. PATENT DOCUMENTS

| | | |
|---|---|---|
| 2,571,415 | 10/1951 | Brown . |
| 2,750,585 | 6/1956 | Andersen et al. . |
| 2,782,752 | 2/1957 | Dorn et al. . |
| 3,621,210 | 11/1971 | Canning et al. . |
| 3,998,513 | 12/1976 | Kobayashi et al. . |
| 4,008,938 | 2/1977 | Anhalt et al. . |
| 4,013,344 | 3/1977 | Bescond . |
| 4,176,546 | 12/1979 | Gibson et al. . |
| 4,258,317 | 3/1981 | Dubauskas . |
| 4,367,467 | 1/1983 | Emile, Jr. .................. 340/815.2 |

Primary Examiner—Ernest F. Karlsen
Attorney, Agent, or Firm—Dale Gaudier

[57] ABSTRACT

A modular analog/digital display for use in a cylindrical aircraft instrument housing is designed to enable the digital components to be assembled without interference to the analog meter mechanism. The digital display is of the leadless type and is clamped under compression to a circular circuit board with a pair of contact strips in registration with contacts formed on the circuit board and digital display. The design also features a screw-on dial pointer which facilitates the assembly of the digital display components and dial to the analog meter mechanism without interference.

10 Claims, 15 Drawing Figures

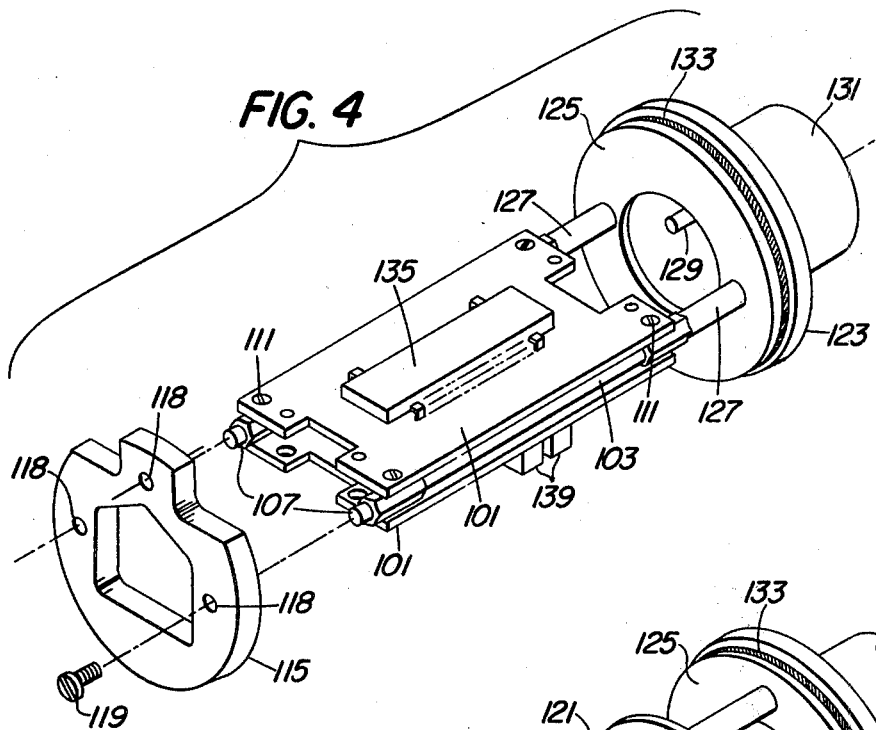
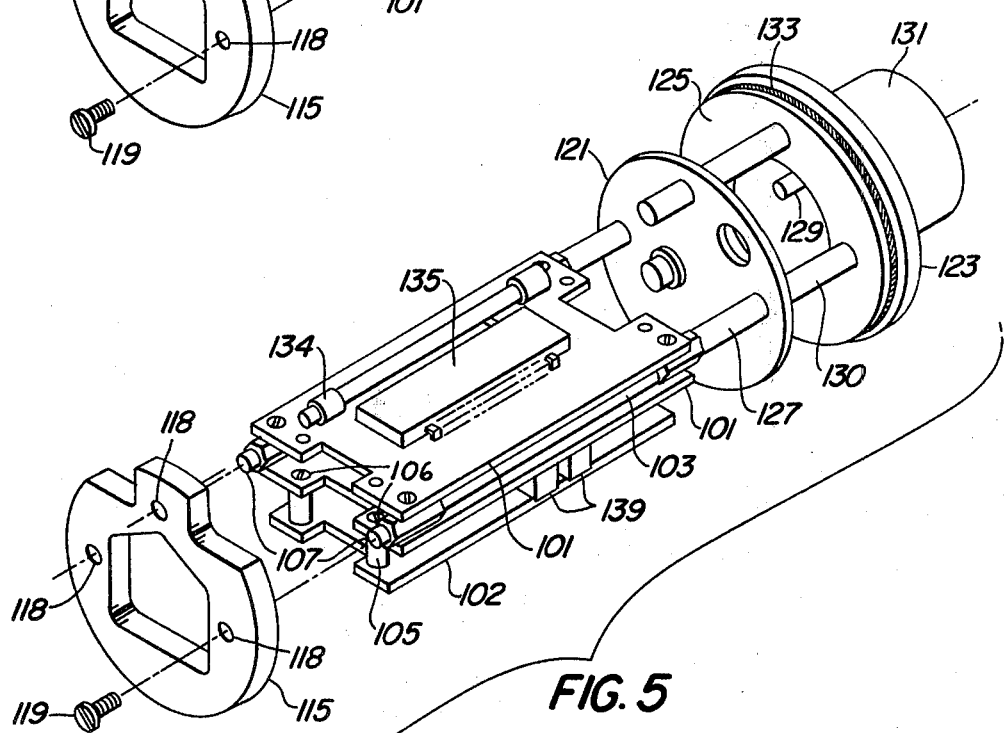

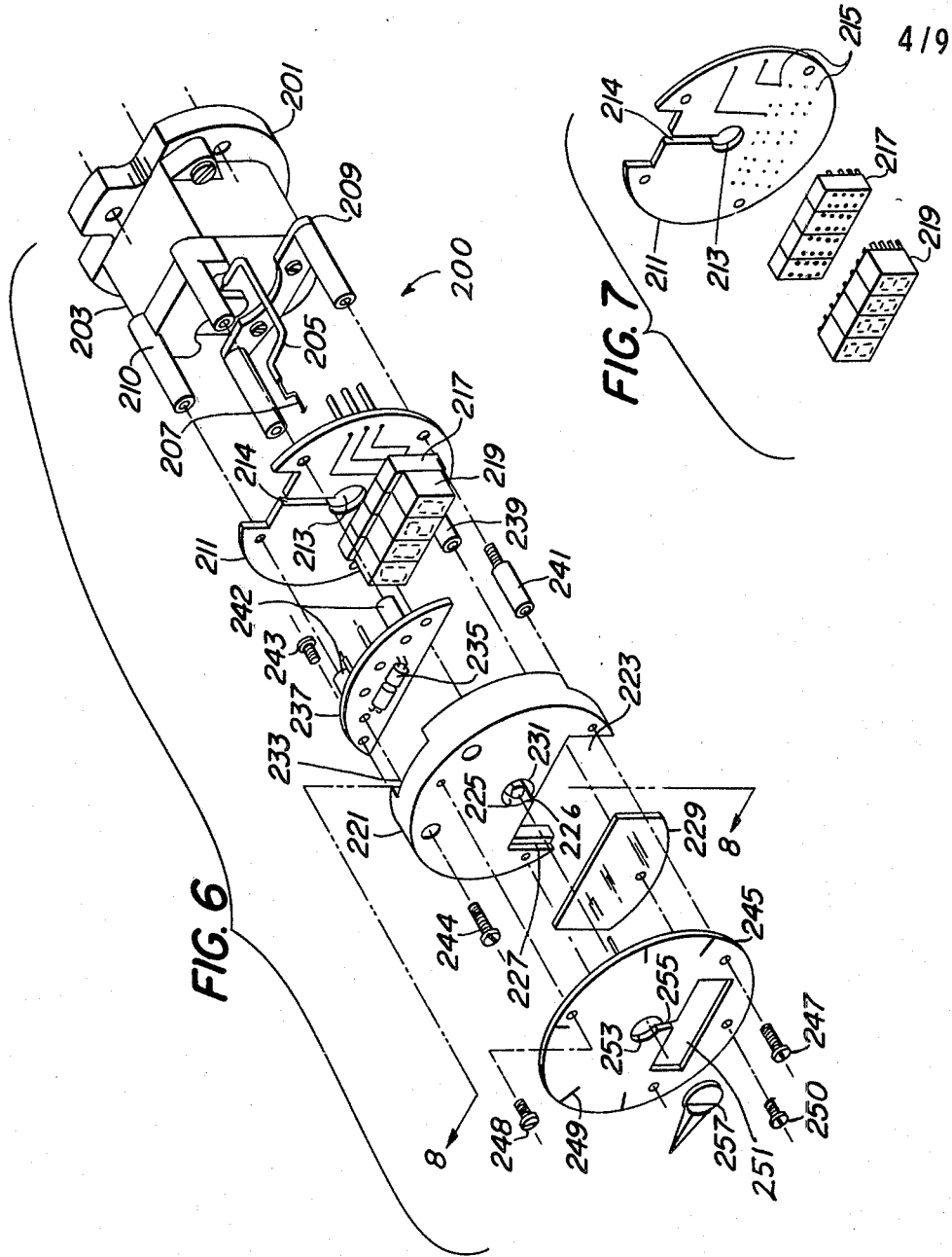

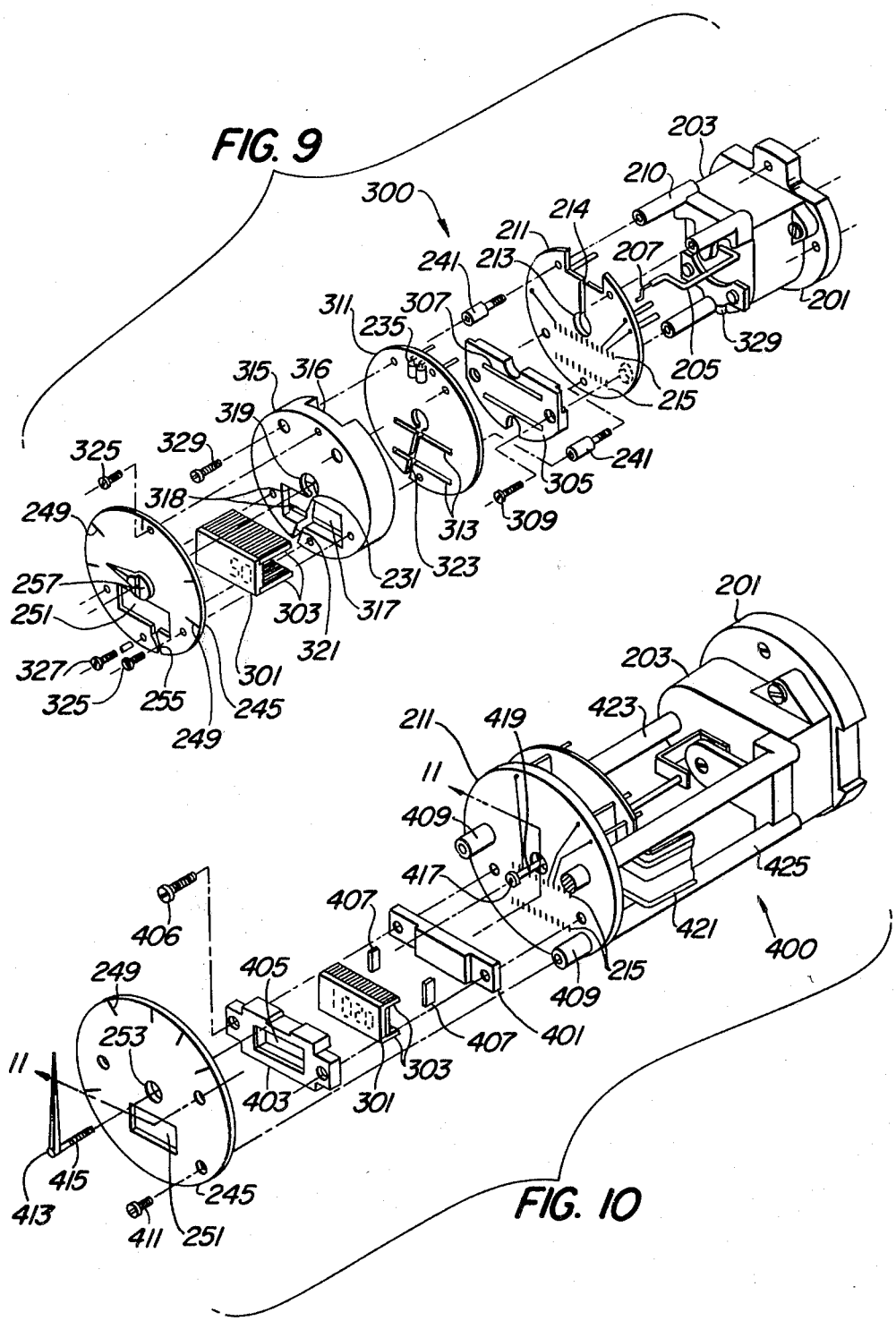

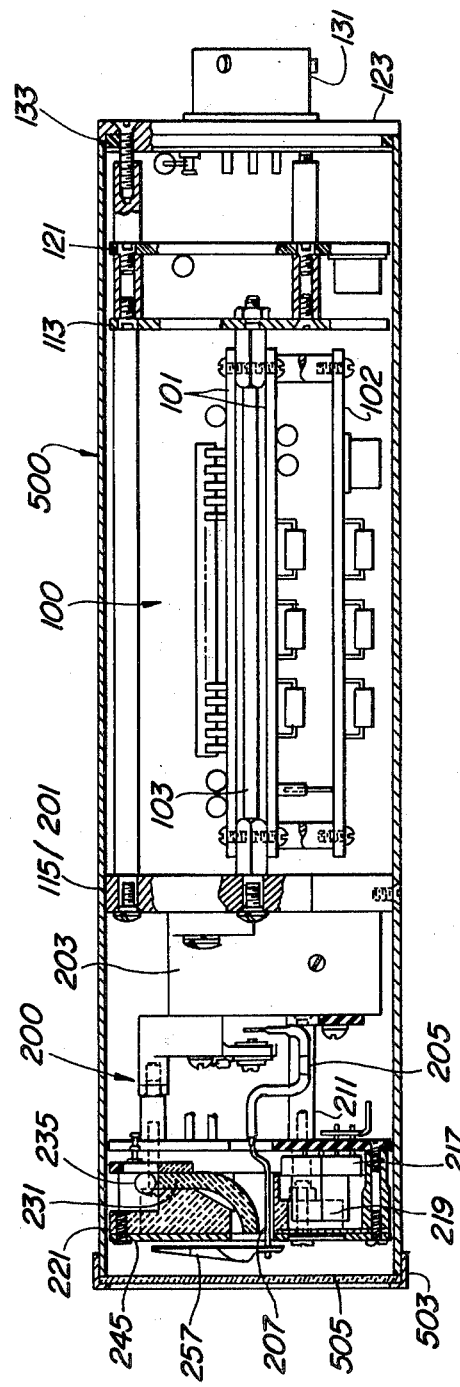
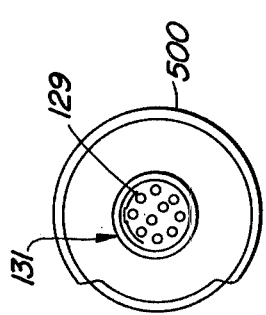
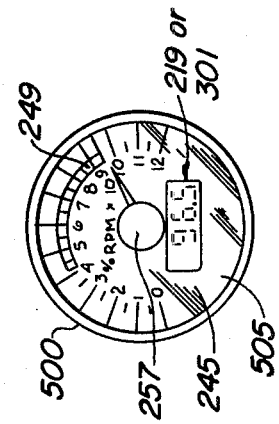
FIG. 12b
FIG. 12c
FIG. 12a

DISPLAY CONNECTION SCHEME FOR MODULAR ANALOG/DIGITAL INSTRUMENT

BACKGROUND OF THE INVENTION

Cross reference to related applications

This application is related to application Ser. No. 262,849 entitled "CIRCUIT BOARD MOUNTING ARRANGEMENT FOR USE IN CYLINDRICAL INSTRUMENT HOUSING", Ser. No. 262,851 entitled "MODULAR BACKLIGHTED ANALOG/DIGITAL INSTRUMENT DISPLAY", and Ser. No. 262,850 entitled "SCREW-ON POINTER FOR ELECTRICAL MEASURING INSTRUMENT", filed simultaneously with the present application, and assigned to the assignee of the present application.

1. Field of the Invention

The invention relates to the field of indicating instruments, and more particularly to a digital display mounting arrangement for use in an analog/digital aerospace instrument.

2. Description of the Prior Art

Aircraft and aerospace instruments have traditionally comprised one or more analog meter movements mounted within a housing and coupled to a pointer disposed adjacent an analog dial having graduated markings formed thereon. For convenience in reading such instruments in darkness or under poor conditions of illumination, these instruments are often provided with some form of backlighting or edge-lighting to illuminate the dial and/or pointer.

While such analog instruments have found widespread use throughout the aerospace industry such instruments have a major drawback in that an analog instrument must be interpreted by the human observer. Such observations are prone to error, especially in view of the literally dozens of such instruments which must be constantly scanned in modern commercial and military aircraft.

In order to obviate these problems there has been a demand for more precise display of critical operating parameters such as can be provided by digital displays. For human engineering purposes, it is generally desirable to combine an analog display with a digital display of a critical operating parameter.

Severe environmental constraints are placed on any proposed analog/digital instrument design. Such instruments must be rugged, accurate and reliable even when subjected to extremes of temperature, pressure, and vibration as is common in aircraft and aerospace environments. In addition, military and commercial standards dictate that most panel instruments can be circular in shape and fit within standardized openings (diameter and depth) in an instrument panel. A problem arises in that the large number of electronic components needed to drive a digital display or used for signal conditioning of an analog display will often fill the space available behind the mounting panel without leaving sufficient room for the analog (mechanical) movement. The complexity of components and lack of space within the instrument housing also make it difficult to assemble the digital display and analog meter movement together without interference with each other and to readily interconnect components on adjacent circuit boards. Such difficulties increase manufacturing and repair costs. In addition, the complexity of such displays makes it difficult to adapt an instrument to different lighting requirements and display types, e.g. light emitting diode (LED), liquid crystal (LCD), incandescent displays of the integral lead or leadless types which are edge-illuminated, backlighted or unilluminated, for example.

There is thus a need for a compact and modular analog/digital instrument which is adaptable to various types of displays and lighting techniques and in which the digital display can be assembled or disassembled without interference to the analog meter movement in order to facilitate manufacturing, and to thus reduce assembly and repair costs.

In addition, it would be desirable if such an instrument were provided with a simple yet rugged means for mounting a leadless digital display for use in a analog/digital instrument wherein such assembly does not interfere with the analog movement.

SUMMARY OF THE INVENTION

The present invention is directed toward an improved digital display mounting arrangement for use in an analog/digital aerospace indicator instrument. In its broadest aspect, the present invention comprises a base adapted to fit within a cylindrical instrument housing to which an analog meter movement is mounted. The meter movement includes a rotatable shaft having a portion thereof which extends in a direction substantially parallel to the longitudinal axis of the housing. A circuit board adapted to fit within the housing is mounted in a spaced apart relationship to the meter movement. The circuit board includes electrical contacts formed on a portion thereof and an opening formed therein for receiving the meter movement shaft. Spacer means are disposed between the circuit board and the digital display, and electrically conductive means, such as elastomeric contact strips, are disposed between the contacts of the digital display and the circuit board. Clamping means is designed to fit over the digital display, contact strips and spacer means so that when the clamping means is fastened to the circuit board it causes the conductive portions of the contact strips to be pressed into electrical contact with the contacts of the digital display and the contacts formed on the circuit board.

In the preferred embodiment, the digital display is of the leadless type including at least one row of electrical contacts formed thereon and the circuit board includes at least one row of electrical contacts formed thereon and disposed substantially opposite the digital display contacts. The electrically conductive means comprises at least one contact strip of compressible dielectric elastomeric material having electrically conductive portions provided thereon, with these conductive portions being spaced apart and arranged to positively electrically connect the digital display contacts with the circuit board contacts when the display is assembled to the circuit board by the clamping means.

An analog dial is mounted to the circuit board and includes first and second openings for respectively receiving the meter shaft and for exposing the operative face of the digital display to view. To complete assembly of the analog/digital mechanism, a dial pointer is mounted to the end of the meter movement shaft and arranged adjacent the dial. In a preferred embodiment, the meter shaft is threaded to receive a complementary threaded portion formed on the dial pointer. This arrangement enables the dial pointer to be readily screwed on to the meter shaft after all other components have been assembled together.

In an alternative embodiment, slotted guide means are provided between the digital display and circuit board which act to support and guide the contact strips between the display contacts and the circuit board contacts. In this embodiment the dial acts as the clamping means for the digital display and contact strips.

The completed analog/digital indicator assembly is then easily inserted into a standard (e.g. 2 inch diameter) cylindrical housing to which a clear protective cover has been secured. The completed analog/digital indicator assembly is quite compact and leaves plenty of room in the cylindrical housing (typically of a maximum length of 7 inches) for the various electronic components mounted on circuit boards which are used for driving the digital display and for conditioning signals before application to the analog meter movement. An example of such a circuit board mounting arrangement which may be advantageously used with the present invention is shown and claimed in my co-pending application Ser. No. 262,849, filed May 12, 1981, entitled "CIRCUIT BOARD MOUNTING ARRANGEMENT FOR USE IN CYLINDRICAL INSTRUMENT HOUSING". The mounting structure shown in the referenced co-pending application enables large scale integrated circuits, including microprocessors, to be used for the aforementioned purposes while providing a shock resistant structure for the circuit boards and components.

As will be appreciated, the above-described display mounting arrangement enables the analog and digital portions of the instrument to be separately assembled, and facilitates assembly or disassembly of the digital display without interference with the analog meter movement. In addition, the described arrangement is adaptable to various types of digital displays and lighting requirements. The display assembly is rugged and includes a minimum of parts, thus reducing manufacturing and labor costs while retaining the high reliability and accuracy needed in a aircraft or aerospace instrument.

BRIEF DESCRIPTION OF THE DRAWING FIGURES

These and other features and advantages of the present invention will be readily understood with reference to the following detailed description of the preferred embodiments of the invention, when taken in conjunction with the accompanying drawing figures wherein:

FIGS. 4 and 5 show modified versions of the circuit board mounting arrangement of FIG. 2;

FIG. 6 is an exploded perspective view of one form of backlighted analog/digital instrument display for use with the circuit board mounting arrangements shown in FIGS. 2 through 5;

FIG. 7 shows one form of digital display mounting for use with the instrument of FIG. 6;

FIG. 9 is an exploded perspective view of an alternative form of backlighted analog/digital instrument display wherein the digital display is edge-lighted;

FIG. 10 is an exploded perspective view of an analog/digital display showing an alternative form of mounting for the digital display;

Figure 13:
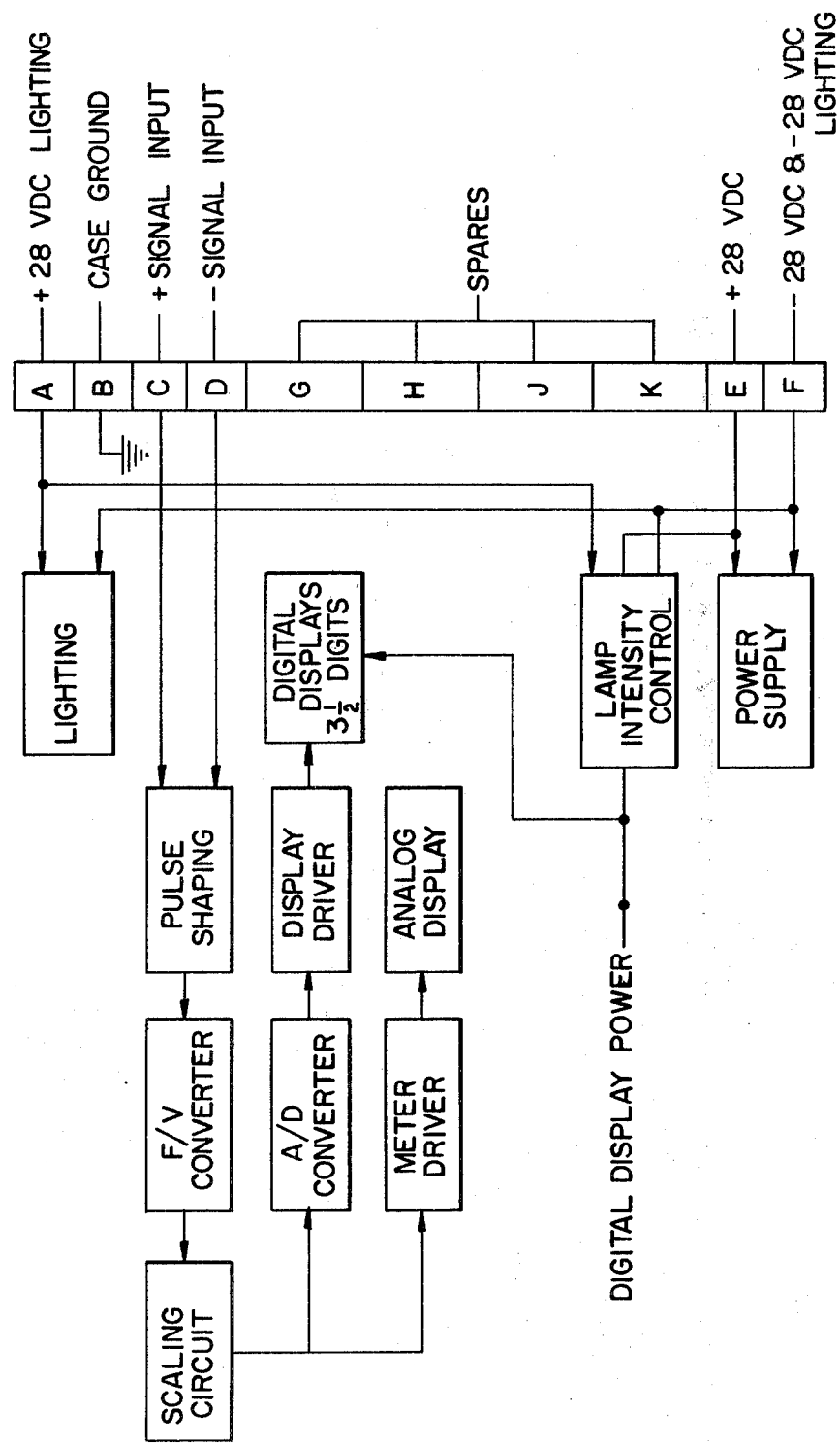

FIGS. 12a, b, c respectively show a front plan view, a side cross-sectional view and a rear plan view of a typical instrument housing in which the devices of FIGS. 1–10 are designed to be mounted; and FIG. 13 is a block diagram of circuitry representative of that which can be mounted to the circuit board arrangements of FIGS. 2–5 and which is useful with the analog/digital instruments of FIGS. 6–10.

DETAILED DESCRIPTION OF THE PREFERRED EMBODIMENTS

1. Overall system arrangement

Figure 1:
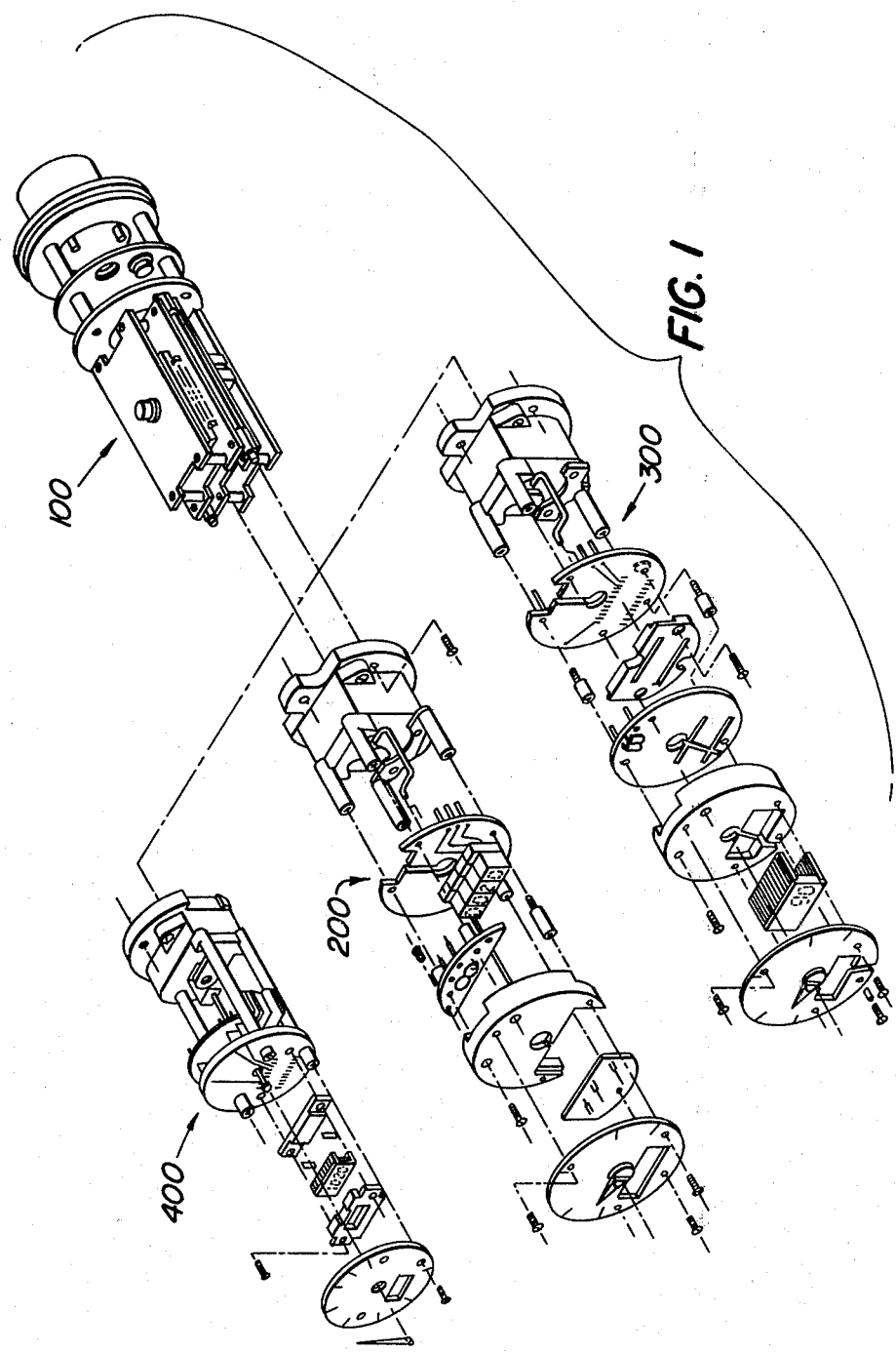
FIG. 1 is an exploded perspective view of the circuit board mounting arrangement and modular analog/digital instrument displays for use therewith.

FIG. 1 shows the overall relationship of the circuit board mounting arrangement, denoted generally at 100, with three types of modular analog/digital instrument display assemblies, denoted as 200, 300 and 400.

More particularly analog/digital display assembly 200 includes a self-illuminated digital display (such as that formed from light emitting diodes or incandescent lamps) and an illuminated dial and pointer. Display assembly 300 features a non-self-illuminated display (such as a liquid crystal display) and means for edge-lighting this display and backlighting an analog dial and pointer. Display assembly 400 features a screw-on-pointer and shows an technique for mounting a leadless digital display to a circuit board for use with an analog/digital instrument assembly.

As will be described in more detail below, the circuit board mounting arrangement 100 and modular display arrangements 200, 300 and 400 enable a compact and rugged analog/digital aircraft or aerospace instrument to be constructed which is designed to fit within the confines of a small diameter (e.g. 2 inch) cylindrical instrument housing, such as is shown in FIGS. 12a–c.

Each of the above mentioned assemblies will now be described in more detail.

2. Circuit board mounting arrangement

Figure 2:
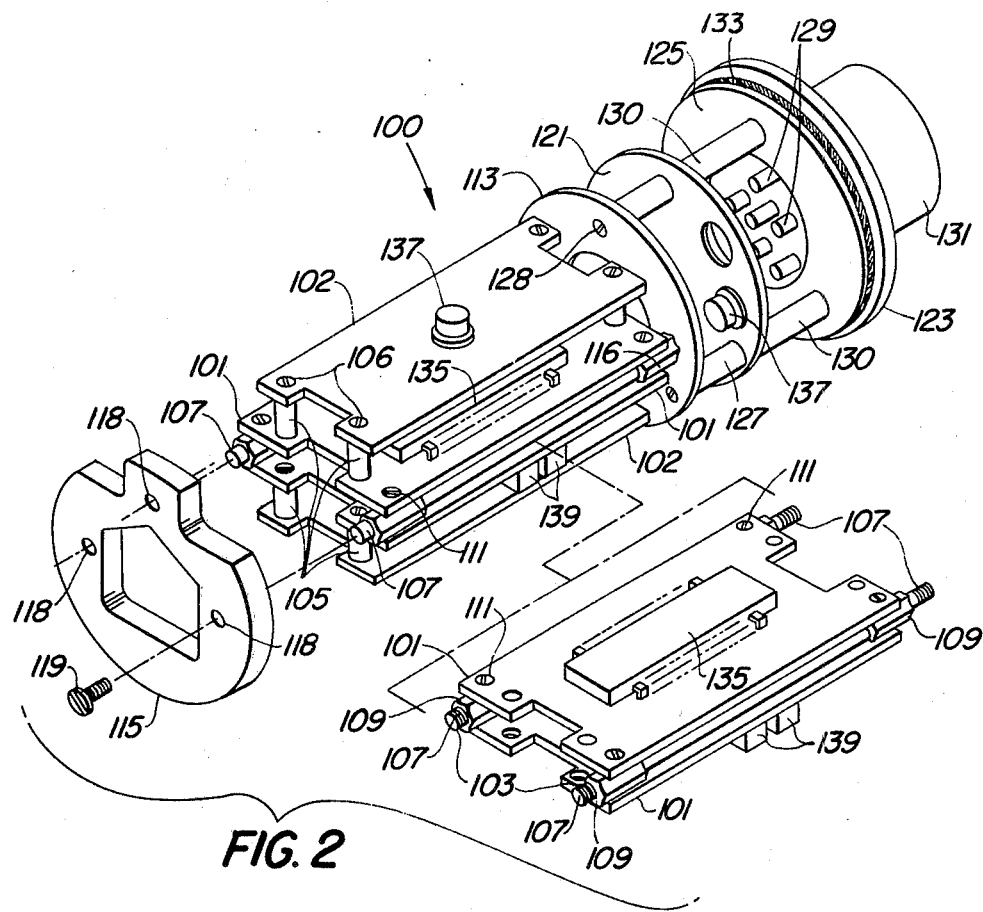
FIG. 2 is an exploded perspective view of another form of circuit board mounting arrangement in accordance with the present invention.
Figure 3:
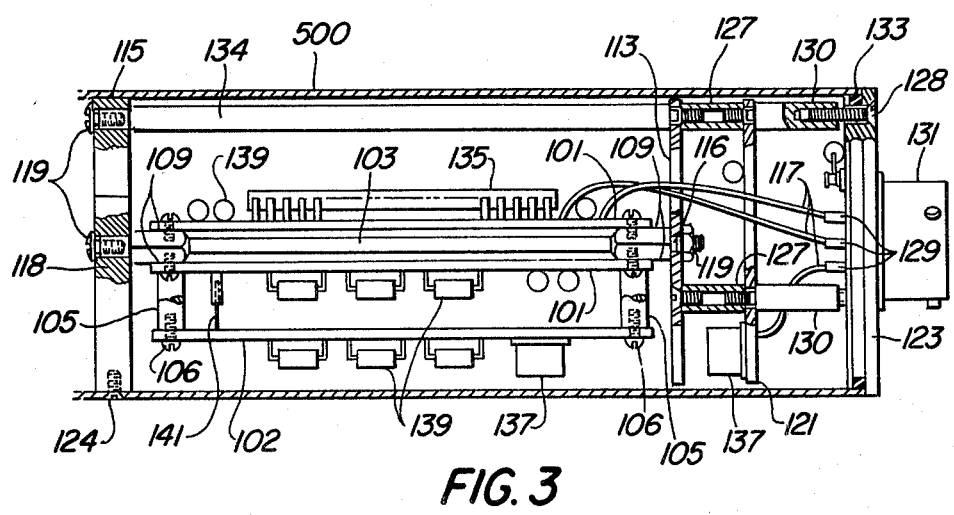
FIG. 3 is a partial cross-sectional view of one form of circuit board mounting arrangement.

With reference to FIGS. 2 and 3, circuit board mounting arrangement 100 comprises one or more substantially rectangular circuit boards 101 and 102 (a total of four such boards being shown in FIG. 2). Circuit boards 101 are held in a spaced apart parallel relationship with respect to each other by means of supports 103. Circuit boards 102 are spaced apart from boards 101 by means of spacers 105.

Supports 103 each comprise an elongated rod having mounting means, such as threaded means 107, formed as part of each end of the rod. Each support further includes at least a pair of flat areas 109 disposed parallel to each other and adjacent to the mounting means of each end of the support. As shown in FIG. 2 these flat areas 109 can take the form of a six sided surface formed adjacent the mounting means of the supports 103. Additional parts of flat areas 109 can be formed along supports 103 in case support of boards 101 is needed at some point intermediate the ends of supports 103.

In a preferred arrangement supports 103 are disposed substantially parallel to the longitudinal axis of an instrument housing 500 (shown in more detail in FIGS. 12a–12c). One or more circuit boards 101 are mounted to flat areas 109 of supports 103 through any conventional fastening means, such as the threaded fasteners 111 shown in FIGS. 2 and 3. Supports 103 and circuit boards 101 are dimensioned along their longer sides such that mounting means 107 project outward from the perimeter of circuit boards 101. Circuit boards 101 and 102 are also dimensioned along their shorter sides to be less than the inside diameter of instrument housing 500 with circuit boards 102 being slightly narrower in width than boards 101. The spacing between support faces 109 determines the spacing between facing boards 101 and is chosen to prevent arcing from occurring between the circuits etched on the facing boards.

Spacers 105 are shown as short hollow internally threaded cylindrical studs which enable the mounting of one or more additional circuit boards 102 to the first pair of circuit boards by means of threaded fasteners 106. Obviously, supports 103 of the elongated rod type can be substituted for the stud type spacers 105. Spacers 105 are merely shown to demonstrate that spacer means of other types can be used successfully in combination with supports 103.

A completed circuit board and support assembly, comprising at least one circuit board 101 and a pair of supports 103 is then mounted to a pair of mounting plates 113 and 115 as shown in FIGS. 2 and 3. Mounting plates 113 and 115 have a substantially circular shape and are dimensioned to fit within instrument housing 500. Mounting plates 113 and 115 may further include one or more openings formed therein for accommodating wiring, such as a wiring harness 117 as shown in FIG. 3. Wiring harness 117 has been omitted from the other drawing figures for the sake of clarity. Each of the mounting plates 113 and 115 further includes at least a pair of openings adapted to receive mounting means 107 of supports 103.

Mounting plates 113 and 115 are assembled to mounting means 107 of supports 103 through respective openings 116 and 118 formed in plates 113 and 115. Preferably, mounting means 107 are threaded and mounting plates 113 and 115 are secured to the mounting means by conventional threaded fasteners 119.

In the embodiment shown in FIGS. 2 and 3, mounting plates 113 and 115 are shown as separately mountable components. This enables one or more substantially circular circuit boards 121 to be mounted between rear mounting plate 113 and an instrument housing end cap 123. However, in some instances it may be desired to mount the circuit board support assembly directly to end cap 123, as shown in FIG. 4. In this case mounting means 107 of supports 103 can be mounted directly to an interior face 125 of end cap 123, or can be spaced apart therefrom by means of a pair of hollow internally threaded spacers 127. A pair of threaded bolts 128 are used to secure end cap 123 and spacers 127 to supports 103. Thus, in the embodiment shown in FIG. 4, end cap 123 acts as one of the mounting plates for the circuit board support assembly.

Likewise, mounting plate 115 can serve a dual purpose, namely as a base to which an analog/digital indicator assembly, such as those shown in FIG. 1 and FIGS. 6–10, can be mounted. Plate 115 can optionally be secured to housing 500 by means of radially disposed threaded fasteners 124 (see FIG. 3).

End cap 123 is of conventional design and is dimensioned such that face 125 fits securely within housing 500. End cap 123 includes a plurality of feed-through type electrical connectors 129 to which the wires of wiring harness 117 are connected. Connectors 129 are surrounded by a socket shroud 131 formed as part of end cap 123. Connectors 129 and shroud 131 are of conventional design for use with plug-in or screw-on type wiring harnesses as is well known in the aircraft instrumentation art. End cap 123 is secured to housing 500 using conventional fastening means. For example, housing 500 can be internally threaded to receive complementary threads formed on a mating portion of end cap 123 or a bayonet-type mounting arrangement can be used. Alternatively end cap 123 is secured to housing 500 using radially disposed threaded bolts or by means of soldering. If desired, a gasket-type seal, such as an O-ring 133 can be provided around the periphery of face 125.

While the mounting arrangement of FIG. 2 shows a total of four rectangular circuit boards being mounted in a stacked fashion, it is to be understood that fewer or greater numbers of circuit boards may be so arranged, as desired. For example, FIGS. 3 and 5 show three circuit boards 101 and 102 mounted together. FIG. 4 shows a pair of circuit boards 101 mounted in a spaced apart fashion by supports 103, the supports in turn being attached to a mounting plate 115 and end cap 123, the end cap acting as a mounting plate in this embodiment.

In FIG. 5, two circuit boards 101 and one circuit board 102 are shown mounted to supports 103 and spacers 105. The circuit board and support assembly is then mounted to mounting plate 115 and end cap 123 as described above with respect to FIG. 4. Due to the modular arrangement a circular circuit board 121 can be readily mounted between end cap 123 and the rectangular circuit board mounting assembly by means of hollow threaded spacers 127 and threaded spacers 130. This assembly is attached to end cap 123 by threaded fasteners 128 that pass through the end cap and fit within threaded spacers 130. If desired, an elongated rod spacer 134 can be provided between mounting plate 115 and end cap 123 (or a mounting plate 113) to provide even further rigidity to the circuit board and mounting plate assembly.

Of course, other numbers and combinations of rectangular and/or circular circuit boards can be provided and would be obvious to one skilled in the art. In its minimum configuration one circuit board 101 is mounted to a pair of supports 103 by fasteners 111 and then mounted to mounting plates 113 and 115, or alternatively to end cap 123 and mounting plate 115.

Several advantages flow from the above-described circuit board mounting arrangements. These arrangements help to isolate the rectangular circuit boards from vibration impinging on the instrument housing as there is no direct contact or mechanical connection between the housing and the circuit boards. In addition, the described arrangements are extremely flexible in that multiple circuit boards of both rectangular and circular shape can be easily mounted together in one compact assembly. In addition, the described circuit board mounting arrangements facilitate the use of electrical components and circuits, such as large scale integrated circuits and microprocessors, which are otherwise too large to mount on a conventional circular circuit board. As will be readily appreciated, a greater number of electrical components such as those denoted as 135, 137 and 139 in FIGS. 2-5 can be mounted on a rectangular board as opposed to conventional circular circuit boards (which of necessity can be no larger in diameter than the inside diameter of the instrument housing). By stacking rectangular circuit boards 101 and 102 only a minimum amount of interconnecting wiring (such as flexible cables or plug-in type terminals 141) need be used to connect circuits on adjacent boards 101 and 102, as compared to the large amount of interconnecting wiring which is generally needed in conventional stacked circular circuit board mounting arrangements. The described arrangements also reduce considerably the amount of labor involved in wiring and assembling the circuit boards into an integrated package for use in a cylindrical instrument housing. Thus, the present invention affords not only a simple and vibration-resistant mounting for circuit boards but substantially reduce labor and material costs through greatly reduced requirements for interconnecting wiring.

A further advantage is that the modular nature of the present invention enables all the circuit boards and associated electronics to be built as a subassembly separate and apart from an analog and/or digital instrument display (shown in FIGS. 6-10). The flexibility inherent in these mounting arrangements enables such circuitry to be tailored to an individual customer's specifications for use with any type of display, whether analog, digital or a combination of both. The above-described arrangements also allow optimum use of the limited space available in a cylinrical instrument housing while accommodating sophisticated electronic circuitry, all while providing a simple, easy to manufacture and rugged support for such electronics and associated display mechanisms.

3. Modular analog/digital instrument display

With reference to FIG. 6, there is shown a modular backlighted analog/digital instrument display useful with the above-described circuit board mounting arrangement. Display assembly 200 includes a base 201 (which for example can be mounting plate 115 as shown in FIGS. 2-5) to which an analog meter movement 203 is mounted in any convenient fashion. Meter movement 203 is of conventional and well known design and may for example comprise a moving coil mechanism of the D'Arsonval type. Meter movement 203 includes a rotatable shaft 205 extending in a direction substantially parallel to the longitudinal axis of an instrument housing 500 (as shown in outline in FIG. 8). Meter shaft 205 includes an articulated portion 207 formed at one end thereof to which an analog dial pointer 257 is mechanically connected. A bracket and spacer assembly 209 is mounted to the housing of meter movement 203 (or, alternatively, mounted to base 201). The meter housing includes a pair of mounting bosses 210.

One problem associated with assembling an analog meter mechanism is the fact that the pointer 257 generally must be attached to meter shaft 205 prior to mounting any other components such as an analog dial, digital display or backlighting means. This is because the meter mechanism must be balanced with the pointer attached. Such a requirement prevents assembly of the various analog components in a straightforward manner. The following arrangement is intended to overcome this problem.

A circuit board 211, which for example is substantially circular in shape and adapted to fit within the cylindrical instrument housing, is mounted to bracket assembly 209 as described in more detail below. Circuit board 211 includes an opening 213 and slot 214 adapted to receive rotatable shaft 205. As shown more clearly in FIG. 7, circuit board 211 includes a plurality of electrical contacts comprising plated through openings 215 formed in circuit board 211 to which the leads of digital display sockets 217 are attached in a conventional manner, such as by soldering. Sockets 217 are adapted to receive the leads of digital display readouts 219, which for example may be of the incandescent or light emitting diode types.

Mounted to circuit board 211 is light collecting plate 221. Light collecting plate 221 is adapted to fit within cylindrical housing 500 and is formed from a substantially clear light collecting material such as that known under the trademark PLEXIGLAS ®. Light collecting plate 221 includes a first opening 223 adapted to receive digital display 219 and a second opening 225 and slot 226 adapted to receive the articulated portion 207 of meter shaft 205. The first opening 223 further includes a lip or recess 227 formed therein for receiving a display filter 229. Disposed within opening 225 is one end of a light pipe 231 formed from a light transmissive material such as that used for light collecting plate 221 or of any one of a number of well-known fiber optic materials.

Figure 8:
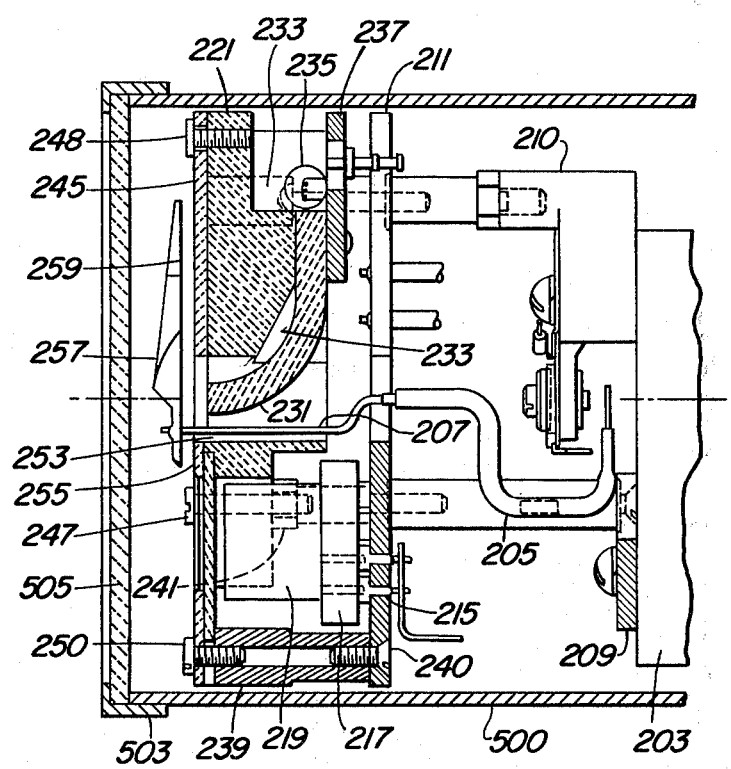
FIG. 8 is a cross-sectional view taken along plane 8—8 of FIG. 6.

Light collecting plate 221 further includes a recess 233 formed in a portion thereof for receiving illumination means 235 and for enhancing the collection of light therefrom by light collecting plate 221. Recess 233 also includes a portion adapted to receive the other end of light pipe 231 and to dispose it adjacent illumination means 235, as shown in FIG. 8. Illumination means 235 comprises, for example, a pair of incandescent lamps mounted to a circuit board 237.

Dial 245 is mounted to light collecting plate 221 by threaded fasteners 247 and 248. Dial 245 is formed from a light transmissive or translucent material and includes one or more dial markings 249 provided thereon. Dial markings 249 are preferably formed by screening selected areas of dial 245 and covering the remainder with an opaque coating such as flat black paint. Alternatively, the dial markings can comprise opaque (dark) areas formed on a translucent dial. The dial and markings can also be formed as an integral part of one face of light collecting plate 221.

Dial 245 includes an opening 251 formed therein which is adapted to expose display 219 to view through filter 229 when the analog/digital instrument is assembled. Dial 245 also includes an opening 253 and slot 255 for accommodating the articulated end 207 of meter shaft 205. Dial pointer 257 can include an opaque light reflective portion 259 formed thereon (from white paint, for example) for selectively blocking or directing light emission from pointer 257 along selected portions thereof.

The analog/digital instrument is assembled as follows. Meter mechanism 203 is fastened to base 201 and brackets 209 are attached to meter mechanism 203. Dial pointer 257 is attached (such as by adhesive bonding) to articulated end 207 of meter shaft 205. Spacer 239 is attached to circuit board 211 via threaded fastener 240. Circuit board 211 (to which sockets 217 have been previously soldered) is slipped over pointer 257 and shaft 205 via slot 214 and seated on bracket spacers 209 and bosses 210 of meter mechanism 203. A pair of threaded studs 241 are used to secure circuit board 211 to bracket spacers 209.

Light pipe 231 is fitted into recess 233 provided in light collecting plate 221. The light pipe is retained in recess 233 by mounting lamp circuit board 237 to light collecting plate 221 via a pair of threaded fasteners 243.

Light collecting plate 221 (with lamp circuit board 237 and light pipe 231 assembled thereto) is slipped over pointer 257 and meter shaft 205 through slot 226 so that articulated portion 207 of shaft 205 is located just below light pipe 231 in opening 225 of the light collecting plate (FIG. 8). The light collector assembly is seated on the two mounting studs 241 and is fastened to meter housing bosses 210 via a pair of threaded fasteners 244 which are passed through openings provided in the light collecting plate, circuit board 211 and spacers 242 (staked to circuit board 237). Mounting studs 241 are then tightened to firmly secure circuit board 211 to bracket spacers 209.

Digital display readouts 219 are plugged into sockets 217 and polarizing filter 229 (if a self-illuminated digital display is used) is fitted into recess 227 provided in light collecting plate 221.

Dial 245 is fitted over pointer 257 through opening 251 and over articulated portion 207 of meter shaft 205 via slot 255 provided in dial 245 (similar to slot 226 provided in light collecting plate 221) so that the articulated portion of the meter shaft is disposed in dial opening 253 (FIG. 8). In cases where pointer 257 is too large to fit through opening 251, slot 255 can be brought all the way out to the circumference of dial 245 (see FIG. 9).

Two threaded fasteners 247 are placed through openings provided at approximately the 8 o'clock and 4 o'clock positions of dial 245 and light collecting plate 221 and fastened to mounting studs 241. Threaded fastener 248 is passed through an opening provided at approximately the 12 o'clock position of dial 245 and fastened to a similar threaded opening provided in light collecting plate 221. Threaded fastener 250 is passed through openings provided at approximately the 6 o'clock position of dial 245 and a lower portion of filter 229 and is fastened to spacer 239.

Once the analog/digital instrument assembly is completed it can be readily attached to the circuit board mounting arrangement described earlier and inserted into cylindrical housing 500 as shown in FIGS. 8 and 12b. A clear window 505 is disposed between a retaining ring 503 which is fitted over one end of cylindrical housing 500. The digital display circuitry and analog meter movement are readily connected to external signals or to signal processing/conditioning circuitry (such as that described above with respect to the circuit board mounting arrangement) in any conventional fashion, such as through connectors 129 of end cap 123.

It will be appreciated that the above-described arrangement enables a backlighted analog/digital display, including an illuminated dial pointer, to be readily assembled without interference occurring between the digital display components and the analog mechanism and pointer. Backlighting of dial 245 is provided by the light from illumination means 235 which is collected and transmitted through light collecting plate 221. The light from illumination means 235 is also transmitted to dial pointer 257 via light pipe 231.

If display 219 is of the self-illuminated type no edge-lighting is needed. Indeed, edge-lighting of such a self-illuminated display would reduce display contrast by washing out the illuminated digits of display 219. To prevent this from happening, and to enhance display contrast for such self-illuminated displays, filter 229 is of the polarizing type which acts to reduce the effect of ambient light on the exposed face of digital display 219. In addition, the edge of recess 233 is coated with an opaque material, such as black paint, to prevent light transmitted through light collecting plate 221 from reaching the exposed face of the digital display. Of course, if a non-self-illuminated display, such as a liquid crystal display, is used and it is desired to edge light such a display, the edge of recess 233 can be left clear and polarizing filter 229 can be omitted.

The described analog/digital display arrangement thus enables a simple yet versatile instrument to be built all in one compact unit which can be fitted into a cylindrical instrument housing. As the various components are modular, the digital and analog portions of the displays can be assembled (or disassembled for repair) without interference with one another. This greatly reduces the time and labor involved in manufacturing such displays and thus results in a low cost, yet rugged analog/digital display.

FIG. 9 shows an alternative embodiment of an analog/digital display 300. Display 300 is in many respects similar to that shown in FIG. 6 and similar components are denoted using similar reference numerals.

In FIG 9 a non-self-illuminated display 301 is shown, such as a liquid crystal display. Such displays may be of the leadless type, as shown, or may include leads or pins for mounting to a socket or directly to a circuit board such as previously described with respect to FIG. 7. If a leadless unilluminated display such as 301 is used, some means for connecting contact pads formed on the display with etched terminals 215 formed on the surface of circuit board 211 must be provided. Such contact means can take many forms. However, in the preferred embodiment such contact means take the form of two contact strips 303 of elastomeric dielectric material in which are embedded (or formed on a surface thereof) a plurality of spaced apart conductive portions. Such types of elastomeric contact strips are well known and include those sold under the trade name ZEBRA ®.

As contact strips 303 are somewhat flexible some means for supporting them must be provided between display 301 and terminals 215 of circuit board 211. To this end, a guide 305 having two transverse slots 307 formed therein is mounted to circuit board 211 by means of fasteners 309. Mount 311 for illumination means 235 also includes a pair of transverse slots 313 adapted to receive and guide portions of contact strips 303.

Light collecting plate 315 is somewhat similar in arrangement to collecting plate 221 (FIG. 6) and includes a recess 317 and a pair of transverse slots 318 (aligned with slots 313 of board 311) which are adapted to receive display 301 and contact strips 303, respectively, and a second opening 319 adapted to receive light pipe 231 and meter shaft 205.

Analog/digital display 300 is assembled as follows. Analog meter mechanism 203 is mounted to base 201 and single spacer bracket assembly 329 is fastened to the housing of mechanism 203. Circuit board 211 is slipped over shaft 205 through radial slot 214 and is secured to bosses 210 and bracket spacer 329 by means of three threaded mounting studs 241. Contact strips guide 305 is mounted to circuit board 211 via a pair of threaded fasteners 309 which fit into threaded bushings 310 mounted to circuit board 211.

Light pipe 231 is placed in recess 316 (similar to that shown in FIG. 8) formed in light collecting plate 315 with one end disposed in opening 319 of plate 315. Lamp mount 311 (to which lamps 235 have been previously attached) is fitted to the rear face of light collecting plate 315 with transverse slots 313 of mount 311 aligned with slots 318 of plate 315. The light collecting plate and lamp mount are slipped over shaft 205 and pointer 257 (which has been previously attached to shaft 205 in order to allow the meter mechanism to be balanced) via radial slots 321 and 323 formed in plate 315 and lamp mount 311, respectively.

Light collecting plate 315, light pipe 231 and lamp mount 311 are secured to the upper pair of mounting studs 241 (previously secured to bosses 210) by means of threaded fasteners 329 which fit into recessed openings formed in light collecting plate 315.

Contact strips 303 are inserted through slots 318, 313 and 307 of the light collecting plate, lamp mount and contact strips guide, respectively, until they are in contact with etched contacts 215 formed on circuit board 211. Liquid crystal display 301 is placed into recess 317 of light collecting plate 315 until its leadless contacts abut the edges of contact strips 303.

Dial 245 is slipped over pointer 257 and shaft 205 in a similar fashion as described with respect to FIG. 8. Dial 245 is mounted to light collecting plate 315 by means of three threaded fasteners 325 and one threaded fastener 327. Fasteners 325 are threaded through dial 245 and secured to light collecting plate 315 at approximately the 8 o'clock, 12 o'clock and 4 o'clock positions, while fastener 327 is threaded through dial plate 245, light collecting plate 315 and lamp mount 311 at approximately the 6 o'clock position, and is secured to mounting stud 241. As opening 251 of dial 245 is dimensioned slightly smaller than the outer periphery of display 301, the display is securely clamped into contact with contact strips 303 by dial 245.

With the above-described arrangement a non-self-illuminated digital display, such as 301, is edge-lighted by the light from illumination means 235 that is collected and transmitted through light collecting plate 315. In addition, light collecting plate 315 acts to backlight dial 245, and dial pointer 253 is illuminated by light from illumination means 235 which is transmitted through via light pipe 231 as described above with respect to FIGS. 6-8. In addition, the above-described arrangement readily accommodates digital displays of the leadless type (whether self-illuminated or not) in a compact, rugged and easy to assemble package.

Figure 11:
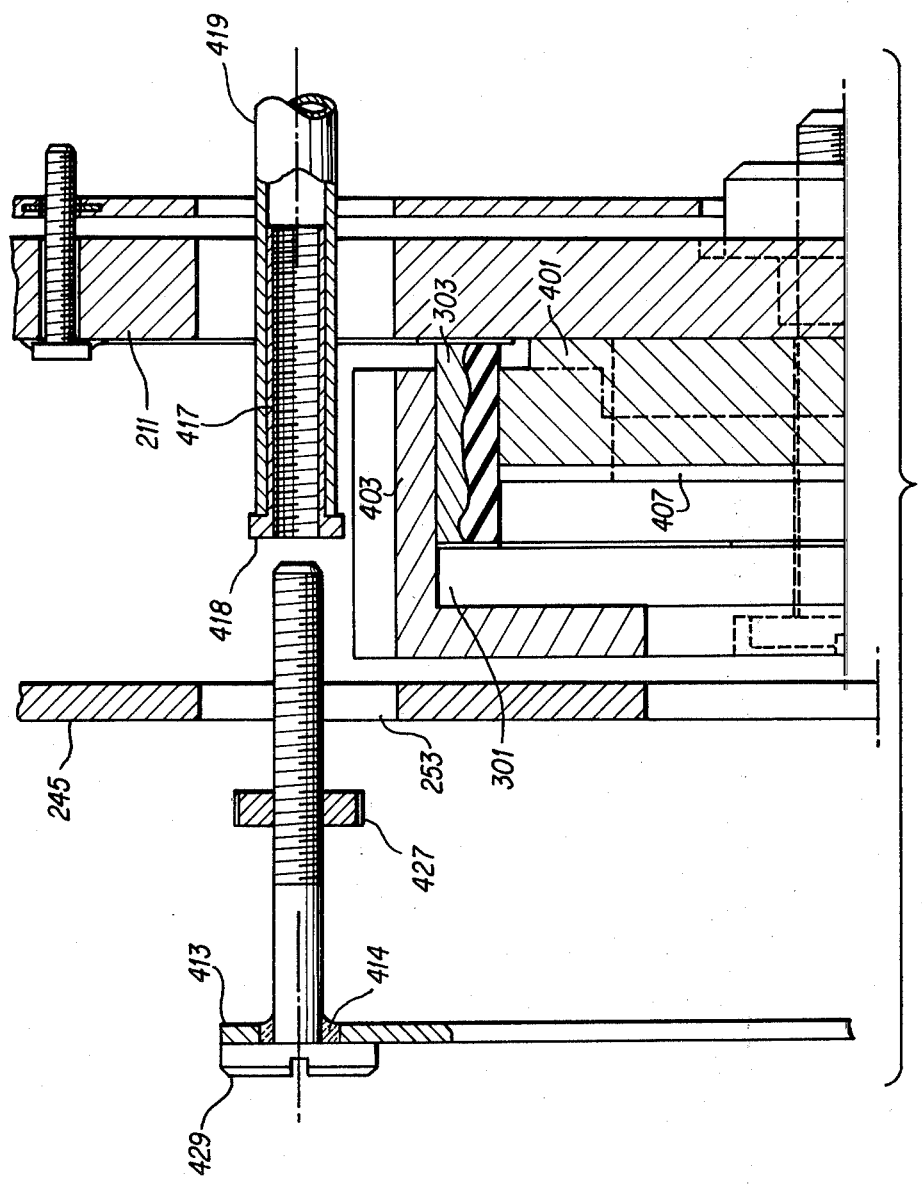
FIG. 11 is a detail cross-sectional view taken along plane A—A of FIG. 10 showing details of construction of a screw-on pointer.

FIG. 10 shows yet another technique for mounting leadless digital displays in an analog/digital instrument, and further shows an alternative technique for attaching a dial pointer to an analog meter shaft (FIG. 11). Parts and components in this embodiment which are common to those in the aforementioned embodiments are denoted using identical reference numerals.

Threaded mounting studs 409 are used to mount circuit board 211 to spacer 423 and bosses 425 of meter movement 203, which in turn is mounted to base 201. Circuit board 211 can be connected to external signals through any conventional means, such as by means of a wiring harness 421 (shown partially in FIG. 10).

Leadless display 301 is mounted to etched terminals 215 formed on circuit board 211 via elastomer-type contact strips 303. Instead of slotted guide 305 and lamp mount 311 (FIG. 9) a spacer 401 is disposed between circuit board 211 and display 301. A display housing 403, having an opening 405 formed therein for exposing display 301 to view, is seated against spacer 401 and fastened to circuit board 211 by means of fasteners 406. Display housing 403 acts to clamp digital display 301 firmly against contact strips 303, thereby causing contact strips 303 to be securely urged into contact with contact pads formed on display 301 and etched contacts 215 of circuit board 211. A pair of gaskets 407 are also provided between either end of display 301 and a surface of spacer 401. The rear of display 301 does not contact spacer 401.

After digital display 301 is assembled to circuit board 211, dial 245 is secured to studs 409 by means of threaded fasteners 411. Non-illuminated pointer 413, which includes a threaded portion 415 along shaft 416, is screwed into a complementary threaded bushing 417 disposed in rotatable meter shaft 419 of meter mechanism 203 as is more fully described below with respect to FIG. 11.

In the embodiment shown in FIG. 10, no illumination means for the digital display or backlight means for the dial and pointer is provided. However, it will be understood that such illumination and backlighting means could be readily incorporated into this embodiment. For example, display housing 403 could be formed from a light transmissive and collecting material and illumination means (such as 235 shown in FIG. 9) could be disposed adjacent thereto to edge-light display 301. Alternatively, a light collecting plate such as 221 (FIG. 6) or 315 (FIG. 9) could be incorporated to provide edge-lighting of display 301 and backlighting of dial 245. If an illuminated pointer is desired, pointer 413 could be replaced with an illuminated pointer such as 257 (FIGS. 6 or 9) and light pipe 231.

The display mounting arrangement of FIG. 10 advantageously enables a leadless digital display and associated contact strips to be securely clamped into contact with terminals formed on a circuit board. As is apparent, the described arrangement enables the display to be mounted without interference with the analog meter mechanism or meter shaft. The screw-on pointer simplifies assembly where illumination of the pointer is not needed.

More particularly, the use of screw-on pointer eliminates the need for slots or cut-outs in the dial which may detract from the appearance of the dial. While the construction of a screw-on pointer would appear to be a straightforward proposition, several problems arise. First, the meter shaft 419 generally is formed from extremely thin-walled hollow tubing (usually of a lightweight material such as a soft-grade of aluminum) which is not easily internally threaded due to its thinness. Thus, if more than a slight amount of force is applied to shaft 419 it will likely bend or distort and destroy its usefulness as a meter shaft. Second, in attaching pointer 413 to meter shaft 419 it would be desirable if the pointer could be locked in a desired angular position with respect to meter shaft 419 and dial 245. Finally, the distance from the pointer to the face of the dial should be adjustable to allow for slight variations in tolerances (such as thickness) of the various components.

To this end, the screw-on pointer shown in the detail cross-section of FIG. 11 is constructed and assembled as follows. Bushing 417 is internally threaded and includes a collar 418 formed on one end thereof. Bushing 417 is fitted into one end of meter shaft 419 with the collar abutting the end of the meter shaft. Bushing 417 can be formed from a thin-walled, yet easily machinable material (such as a machinable grade of aluminum) and serves to stiffen the end of meter shaft 419 into which it is inserted without adding substantially to the weight or inertia of shaft 419. Bushing 417 is held within meter shaft 419 by a dab of adhesive which is applied to the outer surface of the bushing prior to its insertion into the meter shaft.

Pointer 413 includes an opening 414 enabling the pointer to be slipped over pointer shaft 415 until it is seated against the underside of shaft head 429 which is of a diameter larger than the shank of pointer shaft 415 and pointer opening 414. Pointer 413 is secured to shaft 415 and head 429 by conventional fastening means, such as adhesive bonding. Locknut 427 is then threaded over the threaded portion of pointer shaft 415.

The digital display and dial are assembled together as described with respect to FIG. 10. The threaded portion of pointer shaft 415 is passed through opening 253 of dial 245 and threaded into bushing 417 until pointer 413 is at the desired distance from dial 245 and at a desired angular position with respect to the dial. The pointer is then secured in position to meter shaft 419 by turning locknut 427 (by means of a pair of tweezers, for example) until it contacts collar 418 of bushing 417. If desired, the locknut can be permanently secured by applying a dab of adhesive at the point where it and point shaft 415 contact.

As is apparent, the described screw-on pointer enables the angular position and distance of the pointer with respect to the dial to be readily adjusted. The threaded bushing inserted into the meter receives the threaded pointer shaft and acts to stiffen the walls of the meter shaft to prevent bending or distortion thereof when the pointer is threaded to the meter shaft.

As mentioned earlier, the circuit board arrangement of FIGS. 2-5 and analog/digital display arrangements of FIGS. 6-10 are designed to fit within the confines of a standard (e.g. 2 inch) diameter instrument housing 500 as shown in FIGS. 12a-c. A typical analog/digital instrument face is shown in FIG. 12a. Analog/digital instrument 200 and circuit board mount 100 are shown disposed within cylindrical housing 500 in the cross-sectional view of FIG. 12b. FIG. 12c shows a rear view of housing 500 with end cap 123 secured in place.

As briefly mentioned earlier, circuit boards 101 and 102 can contain electronic circuits and components for driving the digital displays and performing scaling and signal processing functions for the analog meter movement. An example of one type of conventional circuitry which can be used with the various embodiments of the present invention is shown in block diagram form in FIG. 13.

The foregoing description is not intended to be limitive or exhaustive but rather illustrative of the invention which is defined by the appended claims.

What is claimed is:

1. A modular analog/digital instrument display for use in a cylindrical housing comprising:
    a base adapted to fit within said housing;
    an analog meter movement adapted to fit within said housing and mounted to said base, said meter movement including a rotatable shaft having a portion thereof extending in a direction substantially parallel to the longitudinal axis of said housing;
    a circuit board adapted to fit within said housing and mounted in a spaced-apart relationship to said meter movement, said circuit board including electrical contacts formed on at least a portion thereof, said circuit board further having an opening formed therein for receiving said meter movement shaft;
    a leadless digital display;
    means for mounting said digital display to said circuit board including means for electrically connecting electrical contacts of said digital display with said contacts of said circuit board, said mounting means comprising spacer means disposed between said circuit board and said digital display, electrically conductive means disposed between said digital display and said circuit board for connecting said electrical contacts of said digital display with said electrical contacts of said circuit board, and means for clamping said digital display, electrically conductive means and spacer means to said circuit board;
    an analog dial adapted to fit within said housing and mounted to said circuit board, said dial including a first opening for receiving said meter movement shaft and a second opening for exposing said digital display to view; and
    a dial pointer mounted to the end of said meter movement shaft extending through said dial, said dial pointer being arranged adjacent to a face of said dial.

2. The instrument display of claim 1 wherein said meter shaft includes an internally threaded bushing and said dial pointer includes a complementary threaded portion and lock-nut for attaching said pointer to said threaded bushing provided in said meter shaft.

3. The instrument display of claim 1 wherein said digital display includes at least one row of electrical contacts formed thereon, said circuit board includes at least one row of electrical contacts formed thereon and disposed substantially opposite said digital display contacts, and wherein said electrically conductive means comprises at least one strip of dielectric material having electrically conductive portions provided thereon, said electrically conductive portions being spaced apart and arranged to electrically connect said at least one row of digital display contacts with said at least one row of circuit board contacts when said digital display is assembled to said circuit board.

4. The instrument display of claim 3 wherein said electrically conductive means comprises at least a pair of strips of elastomeric dielectric material having electrically conductive regions formed therein, said elastomeric strips and said spacer means being dimensioned such that when said digital display, elastomeric strips and spacer means are fastened to said circuit board by said clamping means said elastomeric strips are slightly compressed whereby said digital display contacts and said circuit board contacts are positively electrically connected through said conductive regions of said elastomeric strips.

5. A modular analog/digital instrument display for use in a cylindrical housing comprising:
    a base adapted to fit within said housing;
    an analog meter movement adapted to fit within said housing and mounted to said base, said meter movement including a rotatable shaft having a portion thereof extending in a direction substantially parallel to the longitudinal axis of said housing;

a circuit board adapted to fit within said housing and mounted in a spaced-apart relationship to said meter movement, said circuit board including electrical contacts formed on at least a portion thereof, said circuit board further having an opening formed therein for receiving said meter movement shaft;

a leadless digital display;

means for mounting said digital display to said circuit board including means for electrically connecting electrical contacts of said digital display with said contacts of said circuit board, said mounting means comprising electrically conductive means disposed between said digital display and said circuit board for connecting said electrical contacts of said digital display with said electrical contacts of said circuit board, at least one guide and spacer means adapted to fit within said housing and disposed between said circuit board and said digital display, said means including at least one transverse slot formed therein for receiving and guiding said electrically conductive means between said display contacts and said circuit board contacts, and means for clamping said digital display, electrically conductive means and spacer means to said circuit board, said clamping means comprising an analog dial adapted to fit within said housing and mounted to said circuit board, said dial including a first opening for receiving said meter movement shaft and a second opening for exposing said digital display to view; and a dial pointer mounted to the end of said meter movement shaft extending through said dial, said dial pointer being arranged adjacent to said dial.

6. The instrument display of claim 5 wherein said meter shaft includes an internally threaded bushing and said dial pointer includes a complementary threaded portion and lock-nut for attaching said pointer to said threaded bushing provided in said meter shaft.

7. The instrument display of claim 5 wherein said digital display includes at least one row of electrical contacts formed thereon, said circuit board includes at least one row of electrical contacts formed thereon and disposed substantially opposite said digital display contacts, and wherein said electrically conductive means comprises at least one strip of dielectric material having electrically conductive portions provided thereon, said electrically conductive portions being spaced apart and arranged to electrically connect said at least one row of digital display contacts with said at least one row of circuit board contacts when said digital display is assembled to said circuit board.

8. The instrument display of claim 7 wherein said electrically conductive means comprises at least a pair of strips of elastomeric dielectric material having electrically conductive regions formed therein, said elastomeric strips and said guide and spacer means being dimensioned such that when said digital display, elastomeric strips and guide and spacer means are fastened to said circuit board by said clamping means said elastomeric strips are slightly compressed whereby said digital display contacts and said circuit board contacts are positively electrically connected through said conductive regions of said elastomeric strips.

9. The instrument display of either claim 1 or claim 5 further including means for backlighting said dial.

10. The instrument display of claim 9 including means for illuminating said digital display.

* * * * *